March 23, 1926.  1,577,685
C. S. BRADLEY
APPARATUS FOR COMMUTATING ELECTRIC CURRENTS
Filed July 6, 1922    5 Sheets-Sheet 1

WITNESSES

INVENTOR
Charles S. Bradley
BY
Knight Bro
ATTORNEYS

March 23, 1926.  1,577,685
C. S. BRADLEY
APPARATUS FOR COMMUTATING ELECTRIC CURRENTS
Filed July 6, 1922  5 Sheets-Sheet 4

March 23, 1926.

C. S. BRADLEY 1,577,685

APPARATUS FOR COMMUTATING ELECTRIC CURRENTS

Filed July 6, 1922      5 Sheets-Sheet 5

Fig. 5.

Patented Mar. 23, 1926.

1,577,685

UNITED STATES PATENT OFFICE.

CHARLES S. BRADLEY, OF NEW YORK, N. Y.

APPARATUS FOR COMMUTATING ELECTRIC CURRENTS.

Application filed July 6, 1922. Serial No. 573,115.

*To all whom it may concern:*

Be it known that I, CHARLES S. BRADLEY, a citizen of the United States, residing at New York, county of New York, and State of New York, have invented certain new and useful Improvements in Apparatus for Commutating Electric Currents, of which the following is a full and clear specification, illustrated in the annexed drawings, the particular novel features comprising my invention being more particularly pointed out in the annexed claims.

This application constitutes a continuation in part of my application Serial No. 241,161, filed June 21st, 1918.

My invention relates to an apparatus for commutating the electric current in coils, which are associated by a magnetizing flux, and in which the energy of this flux is conserved at the time commutation occurs. This arrangement of coils so associated may be applied for various purposes. In particular I find it of advantage in transforming direct current of low voltage into such of high voltage or vice versa, in which a plurality of transformer elements are provided whose individual primary and secondary coils are associated by the magnetizing flux in each transformer and in which a separate coil is provided on each transformer associated by the same flux with the primary and secondary, this separate coil being short-circuited at the time of commutation of the primary and secondary coil, so that the energy of the magnetizing flux is conserved by this coil and it also prevents the E. M. F. of the primary and secondary from assuming their working value until the circuit is opened wide enough to prevent arcing.

The particular form of apparatus which constitutes a direct current transformer comprises a plurality of stationary transformers, similar to those used in the alternating current art, having their low and high tension coils respectively all connected in series in a closed circle, and in combination therewith a rotary contact device, which contacts at predetermined times simultaneously with the primary and secondary terminals respectively of certain of these transformers, by which operation these particular transformers cease to remain active members of the series in which they were located previous to the contact, their coils however, remaining in metallic contact with the circuit at such times.

In each of two parallel series of such transformers, a magnetic flux is produced successively in each transformer in one given direction from a given maximum to a maximum in the opposite direction. Each transformer element is successively and automatically rendered ineffective as such by a rotary contact device substantially as soon as its maximum flux is reached. The current produced by the decline of the magnetizing flux is taken care of by a special short-circuiting winding mounted on each transformer element, which winding is short-circuited by a special contact shoe, substantially at the time when the primary and secondary coils of that particular transformer element are short-circuited and cease to be active. By these means, sparking at the contact terminals of the primary and secondary windings is avoided, and the energy of the magnetizing current is conserved by the short-circuiting coil which may be wound for such low voltage that detrimental sparking is avoided at its contact terminals when the said short-circuiting coil is opened.

My invention is illustrated in the accompanying drawings, in which—

Figure 5 shows an arrangement in which a storage battery is connected across the two branches of the tertiary circuit.

Figure 1:
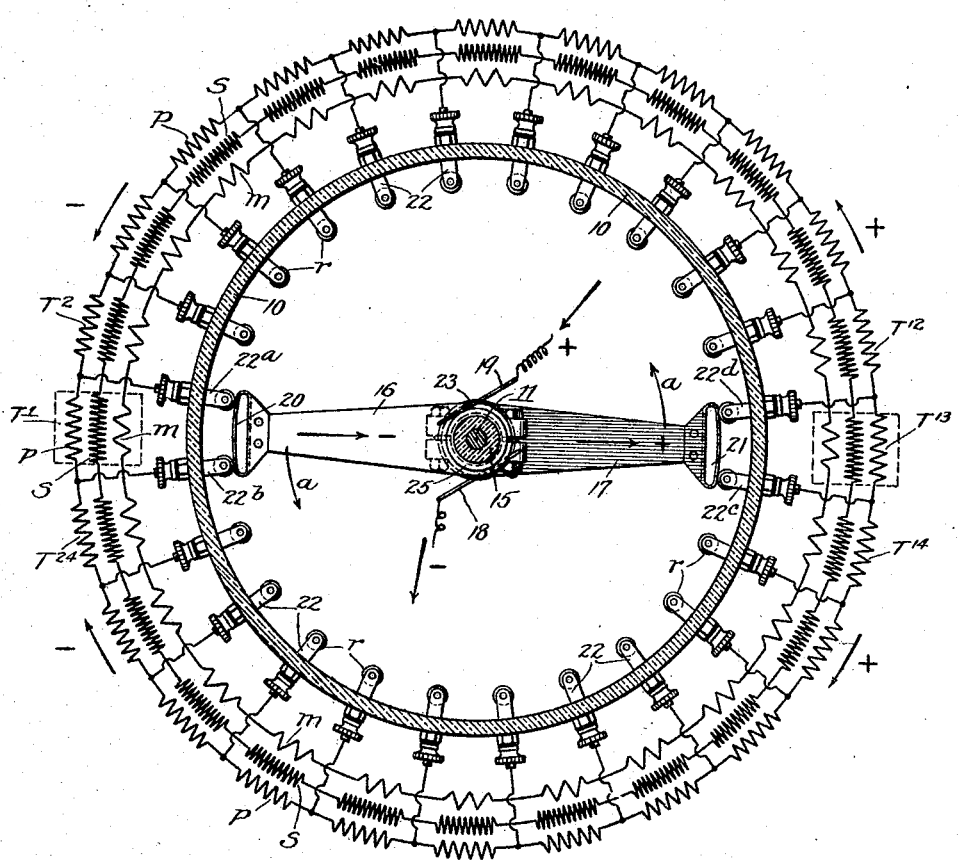
Figures 1, 2 and 3 show the transformer series diagrammatically and connected with the rotary contact device which is shown in transverse section respectively on the section lines A—A, B—B, C—C, in Figure 4.
Figure 2:
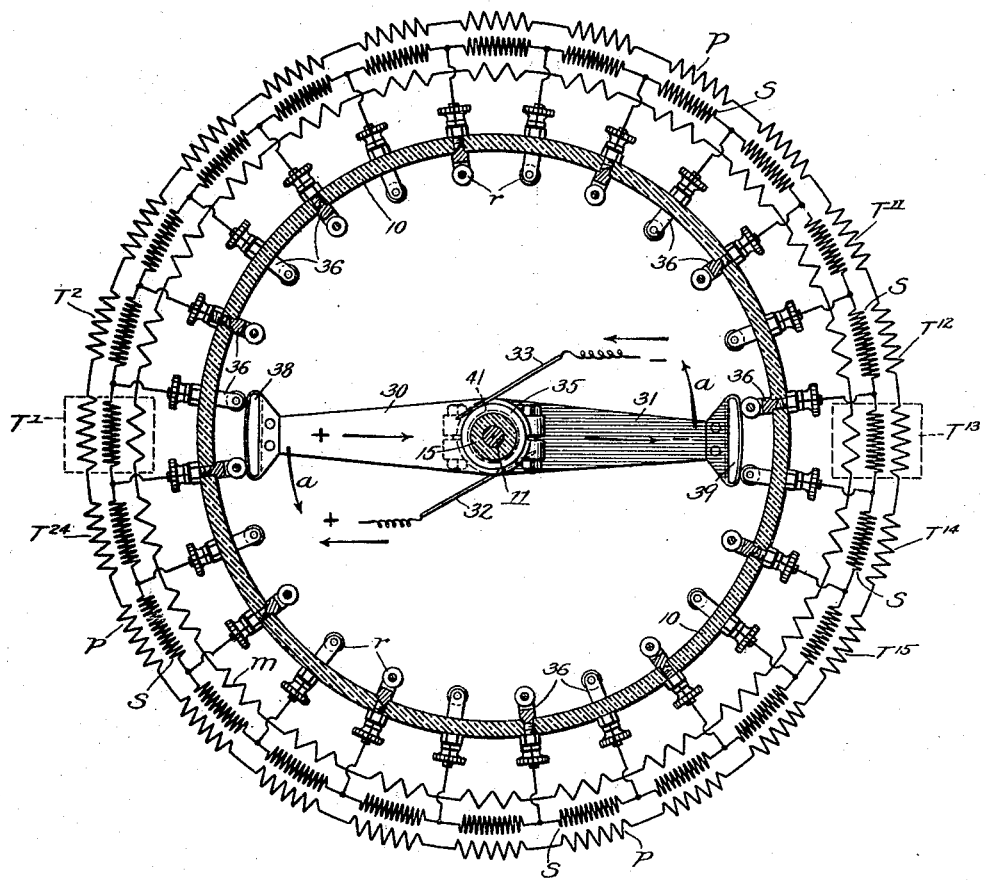
Figure 3:
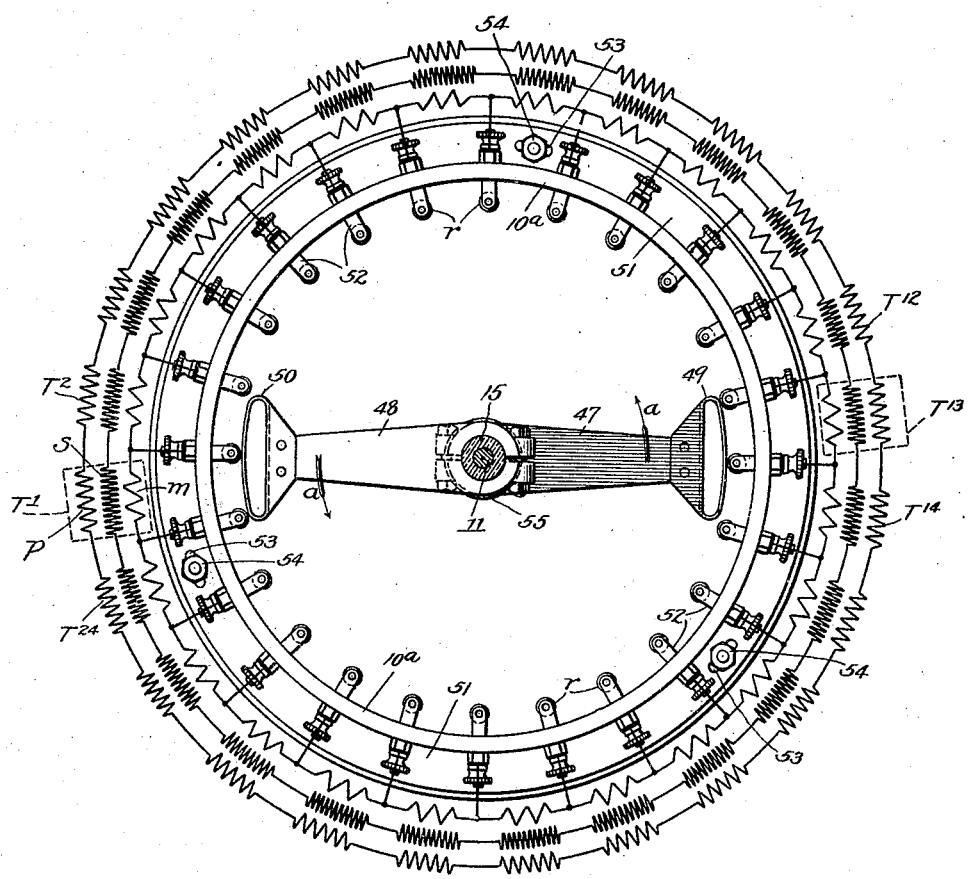

Referring now to Figure 1, the group of coils $p$, $s$, $m$, enclosed in the dotted square represents one of the transformer elements T of the character referred to hereinbefore, of which a number, in this case 24, are connected in series in such fashion, that their primaries $p$, secondaries $s$ and short-circuit coils $m$ respectively form a closed circuit as shown in Figures 1, 2 and 3. To simplify the illustrations, all the transformer elements T are shown in the drawings arranged in a circle, but of course they may be arranged in any way to suit the convenience of the location, for instance like storage batteries in tiers or otherwise, since their physical location does not concern the operation involved in the present invention.

From the junction points of adjacent coils of transformers T, conductors are led to contact terminals—the mechanical arrangement and operation of which I shall now describe.

Figure 4:
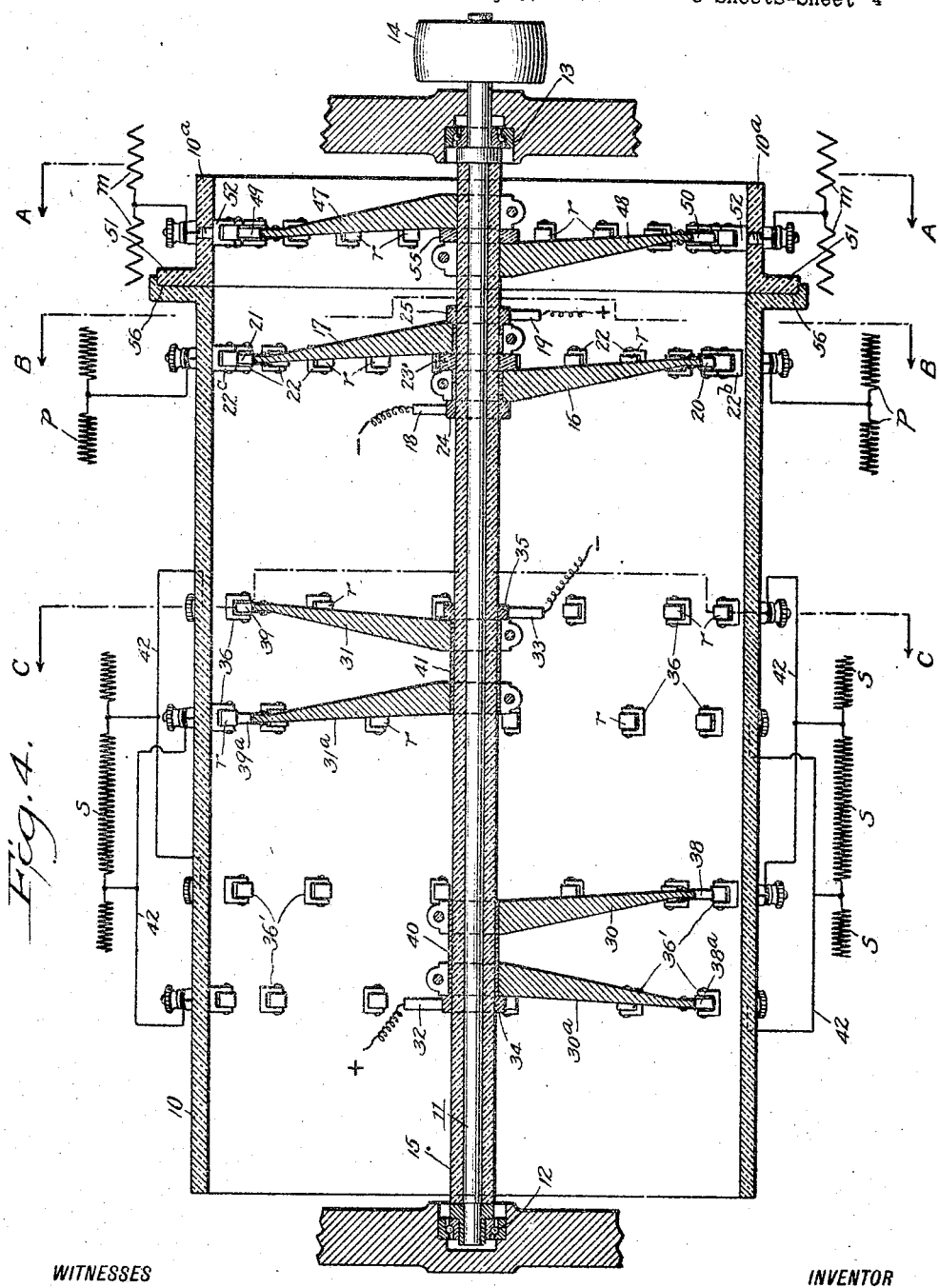
Figure 4 shows a longitudinal central section through the rotary contact device.

Referring now to Figure 4, the contact apparatus comprises a cylinder 10, preferably of insulating material, which has disposed in its center a shaft 11, journalled at both ends at 12 and 13 and which can be driven from a pulley 14 fastened to one of its ends. Fixed to the shaft is an insulating sleeve 15 extending throughout its whole length. On the shaft is fixed a pair of diametrically oppositely arranged conducting arms 16 and 17 of equal length insulated from each other by a spacing ring 23, each arm carrying at its outer end a contact shoe 20 and 21 respectively. Both contact shoes rotate in the same radial plane. The side elevation of these arms is illustrated in Figure 1. Arms 16 and 17 each are connected electrically with a slip ring 24, 25 respectively which rings cooperate with brushes 18 and 19 respectively, brush 19 being connected with the positive pole and 18 being connected with the negative pole of a direct current source of any suitable kind, not shown here.

On the inner periphery of cylinder 10 and in the same plane of rotation of shoes 20 and 21 are mounted a number of equi-distant contact studs 22, each carrying at its inner end a contact roller $r$ which cooperates with shoes 20 and 21. For each junction point of adjacent primary transformer coils $p$ one stud is provided and their outer ends are connected to these junction points as shown in Figure 1. The peripheral length of contact shoes 20 and 21 is made sufficient to just bridge two adjacent contact studs without short-circuiting for an unduly long time the transformer coil which they include.

Assuming now for a moment the position of the contact arms 16 and 17, shown in Figure 1, we have the following two paths of the current: from brush 19 over slip ring 25, outwardly through arm 17, contact shoe 21, the two studs 22 in contact therewith, junction points of the primary coil of transformer element $T^{13}$, thence to the right and left successively through the primaries of the other transformer elements, to the junction points of the primary of transformer $T^1$, studs 22 in contact with shoe 20, inwardly through arm 16, slip ring 24, and brush 18.

For the secondary coils $s$ the transformer elements T a similar contact arrangement is provided with the exception that, on account of the high tension current which these coils carry, it is necessary to increase the distance between two peripherally adjacent contact studs. In order to still be able to accommodate the same number of studs on the periphery of the cylinder as there are secondary coils, I distribute the studs over several radial planes and modify the arrangement of the contact arms accordingly. This is shown in Figures 2 and 4 to which I now refer.

The contact studs 36 in Figure 2, which are connected to the junction points of adjacent secondary coils $s$ and which carry contact rollers $r$ similar to those of studs 22, described before, are disposed on cylinder 10, equi-distant from each other in peripheral direction as shown in Figure 2, but they are arranged alternately in two radial planes as it clearly appears from Figure 4; so that in each radial plane the peripheral distance between two adjacent studs 36 is twice the distance between two adjacent studs 22 in Figure 1. This also clearly appears from Figure 2, where the studs 36 are shown alternately in section (corresponding to the section line C—C in Figure 4), and in full view. By this expedient the danger of flash-over between two adjacent studs is materially lessened.

On the insulated shaft 11 are fixed two radial contact arms 31, 31ª, side by side in alinement with each other in the direction of the cylinder axis, so that in Figure 2, only arm 31 is visible. Each arm rotates one of the two radial planes in which studs 36 are disposed, so that the arms cooperate by means of their contact shoes 39, 39ª with their respective row of studs. Both arms are electrically connected at their hubs by a metallic sleeve 41, which carries at one of its ends a slip ring 35 on which brush 33 slides. By virtue of the fact that the two contact shoes 39, 39ª are in exact alinement, the effect, so far as contact times are concerned, is the same as if only one contact shoe were used with all studs 36 arranged in one radial plane, such as has been shown and described for instance with reference to arm 17, contact shoe 21 and studs 22 in Figure 1. In other words, when arms 31, 31ª rotate, each junction point between two adjacent secondary coils is successively connected to brush 33.

Diametrically opposite arms 31 and 31ª are placed similarly alined contact arms 30 and 30ª. While contact arms 30 and 30ª may be placed in the same radial planes with arms 31 and 31ª, this is mechanically not practicable. I have therefore offset the location of arms 30, 30ᵃ in the direction of the cylinder axis, as shown in Figure 4. These arms are electrically connected with each other at their hubs by sleeve 40 which carries at one of its ends a slip ring 34, on which brush 32 slides. On the outer ends of these arms, contact arms 38, 38ᵃ are provided and the arms and their shoes are in alinement similar to the arrangement of arms 31, 31ᵃ so that in Figure 2 only arm 30 and shoe 38 are visible. I have now provided a second set of contact studs 36' alternately disposed in the two radial planes in which arms 30, 30ᵃ rotate and these studs correspond in their peripheral positions exactly with studs 36, the studs of the two sets, which are similarly located on the periphery in the direction of the cylinder axis, being connected in parallel by a conductor 42 as shown in Figure 4. Therefore in Figure 2 only the studs of set 36 are visible. Thus the entire effect of the arrangement is, that arms 30, 30ᵃ operate as if they were connected diametrically opposite arms 31, 31ᵃ respectively in the same radial planes. These pairs of parallel connected studs of the two sets are successively connected to the junction points of the secondary transformer coils $s$, as shown in Figure 4, so that in effect an arrangement is obtained similar to that shown in Figure 1, and the same as if all studs were arranged in one radial plane as described with reference to Figure 1.

The circuit may be traced as follows: from brush 33 over slip ring 35, dividing itself into arms 31, 31ᵃ, one branch flowing over arm 31, shoe 39, stud 36 in contact with its secondary $s$ of transformer $T^{12}$, successively through the secondaries of $T^{11}$—$T^2$, contact stud 36', shoe 38ᵃ in contact therewith (Figure 4), arm 30ᵃ, slip ring 34, brush 32; the other branch flowing over arm 31ᵃ, shoe 39ᵃ (Figure 4), stud 36 in contact therewith, successively through the secondaries $s$ of transformers $T^{14}$—$T^{24}$, stud 36', shoe 38 in contact therewith (Figure 4), arm 30, ring 34 and brush 32. At slip ring 34 both branches join again. It should be noted that contact studs 36', parallel-connected with studs 36 (Figure 4), cannot be seen in Figure 2, since both sets appear exactly in line with each other in that figure, so that for tracing these two branch circuits both Figures 2 and 4 should be used.

I shall now describe the contact arrangement for the short-circuiting coils $m$ aforementioned, making reference now to Figures 3 and 4.

On shaft 11 are mounted two diametrically oppositely disposed arms 47 and 48, each insulated from the shaft and insulated from each other by collar 55 (Figure 4). Their free ends carry contact shoes 49 and 50 respectively, which both rotate in the same radial plane. With these contact shoes cooperate contact studs 52 mounted on cylindrical portion 10ᵃ in the same radial plane with shoes 49 and 50. Cylinder 10ᵃ is fitted with its flanged portion 51 in a correspondingly recessed flange portion 56 provided on cylinder 10, in which it is held in position by screws 54 (Figure 3). A slight angular shift of both cylinders relatively to each other is permitted by slots 53 provided in flange 51, in which the screw bolts are disposed. The purpose of this shifting will be explained hereinafter.

Each contact stud is connected with one of the junction points of two adjacent short-circuit coils $m$ as shown in Figure 3. Shoes 49 and 50 are of sufficient peripheral length to simultaneously contact with two adjacent studs so as to short-circuit two adjacent coils for the purpose to be explained hereinafter. This peripheral length however is chosen sufficiently great, so as to continue this short-circuit until the bridge formed by the primary and secondary brushes between two of their respective adjacent studs has been opened a sufficient distance to form a safe gap which cannot be broken by a disruptive discharge which may occur at these studs.

Each stud in Figure 3 is provided with a contact roller $r$ similar to those of the other sets of studs described before.

The operation of the device is as follows:—

Referring to Figures 1 and 2, let us assume that low tension direct current is supplied to primary coils $p$ (Figure 1) through brushes 18 and 19. This current traverses coils $p$ in two parallel series as described before with reference to Figure 1. Let us further assume that for the moment all the contact arms of the device stand in the position shown in Figures 1, 2 and 3. Then we have in Figure 1, one series including the primaries of transformers $T^{12}$—$T^2$, the other series including the primaries of transformers $T^{14}$—$T^{24}$. The primaries of transformers $T^1$ and $T^{13}$ carry at that moment no main line current, and their flux is a maximum and as the coil is closed on itself by the contact shoe $a$ large local current flows in it.

Each series of primaries represents a substantial inductance, composed of the inductances of the individual primaries $p$, so that it takes an appreciable time for the flux to pass from a maximum in one direction to a maximum in the other direction in each transformer core. Let us say this takes, for a given design of transformer elements T, one one hundred and twentieth of a second (assuming 60 revolutions per second). Let us further assume that in Figure 1, arms 16 and 17 now start rotating in the direction of arrows $a$ and that contact shoe 20 just leaves stud 22ᵃ so that the primary p of transformer T¹ is just being included in the upper series.

In transformer element T¹, the flux was a maximum at the moment when its coil s was short-circuited, and the flux now declines a little as it starts to change from maxima plus to maximum minus which we assume takes one one hundred and twentieth of a second. If now the rotation speed of the arms 16 and 17 is such that at, or about the expiration of this time, contact shoe 21 has arrived in the place in which shoe 20 is now shown, i. e., after one half revolution, primary p of transformer T¹ is again removed from the upper series, its primary p is commutated out of the main circuit and its flux is conserved. At the same time a similar occurrence takes place with reference to the primary p of transformer T¹³, which, when T¹ is included in the upper series, is included at the same time in the lower series (T¹³—T²⁴) so that the flux commences to change in it gradually to the opposite maximum, when after the above-assumed period of one half revolution, shoe 20 arrives in the position in which shoe 21 is now shown, in which position the flux of a transformer, so connected, again becomes a maximum, but in opposite direction.

The above-described cycle occurs successively with regard to each transformer element T, when the arms rotate at the suitable speed and thus, so long as a primary coil of any transformer element is connected in any of the two series, we always have a changing flux in its transformer core from the time it enters the series until it is again removed.

When all this happens with respect to the primary coils p, a similar change in flux and transfer from one series into the other takes place with respect to the secondary coils s. Now by the changing flux in the transformer cores contained in each of the two series, a current in a given direction is induced in all the secondary coils located at the time in either of the two series.

Thus we have a current induced in the secondaries of each series which in each series always flows in the same direction. The two secondary series being connected in parallel by the contact arms 30, 31, direct current can be taken off at brushes 32 and 33.

It is important to note that during the occurrences described in the foregoing, the main part of the energy like in any ordinary alternating current transformer, is transferred from the primary to the secondary coils and there received as useful energy. When, however, during this operation, the transformer elements are placed into commutating positions, the energy of the magnetizing current, which forms a small part of the main energy supplied to the system, remains in the magnetic flux. Now in order that this flux may not produce detrimental results at the opening of the brush contacts in the primary and secondary circuits, I provide a tertiary circuit for each transformer, in which this flux energy is conserved during the commutation period of its primary and secondary coil. This circuit is provided in the form of the short-circuiting coils m with their contact mechanism described before with reference to Figure 3. The arms 47 and 48 are fixed on the shaft, in such angular relation to the other arms, that their contact shoes 49 and 50 open the short-circuit of coils m of the transformers, which are in commutating position, at the time, or slightly prior to the time, when the primaries and secondaries of these transformers pass from commutating position over into their other parallel series.

Furthermore, shoes 49 and 50 are preferably of sufficient peripheral length, so that they close the short circuiting coils m of those transformer elements, which have about reached their maximum flux, about the same time at which the primaries and secondaries of these transformers are short-circuited in commutating position by their respective shoes.

In order to determine the most favorable positions of opening and closing of short-circuiting coils m, I have mounted the contact studs 52 of these coils on the movable cylinder 10ᵃ, so that these studs may be slightly shifted angularly relatively to the positions of the studs connected to the primaries and secondaries, until the best position is ascertained. The structure by which this is accomplished has been described with reference to Figure 3. Coils m consist of only a few turns of heavy wire so that at the low voltage produced thereby no appreciable sparking may be expected.

While I have described in the foregoing a so-called step-up transformer, it is obvious that by introducing high tension direct current into coils s, low tension direct current may be derived from coils p at their brushes 18 and 19, and thus the device may be used as a step-down transformer without changing the structure or the mode of operation of the device.

Moreover, in order to conveniently store any excess amount of energy, which the primary or secondary system might be called upon to absorb I provide a storage battery 73, connected with the circuits containing the tertiary coils. As shown in Fig. 5, two slip rings of which only 70 is shown in Fig. 5, are provided laterally adjacent to arms 47, 48, each of which rings is connected with one of the short-circuiting brushes 49, 50, by means of conductors 74, 75. On each slip ring a brush 71, 72 respectively slides, the two brushes being in circuit with a storage battery 73. The currents flowing in the two parallel series, comprising the tertiary coils, being of very low voltage, a few storage cells of large capacity would be sufficient to absorb the surplus energy. By these means the system would be considerably steadied, since this stored energy may be released again automatically as soon as the voltages of the primary and secondary systems fall below their normal values.

I claim:—

1. A method of conserving the magnetic flux of a transformer having a primary coil and a secondary coil carrying the working currents and means for commutating the currents flowing through said coils and a tertiary coil of relatively low resistance magnetically associated with said working coils, the method consisting in closing the circuit through said tertiary coil during the commutation of said working currents.

2. In an electric apparatus having coils associated by a magnetizing flux, means for varying the flux linking said coils and means for conserving the energy of said flux outside of said coils, consisting of a short-circuiting coil associated by said flux with said first-named coils and means controlled by said flux-varying means for closing said short-circuiting coil when the maximum value of said flux is attained.

3. A direct current transformer comprising a plurality of individual transformer elements, each having a primary coil and a secondary coil, the primaries and secondaries of all said elements being respectively connected in a closed series, means for dividing each of said closed series of coils into two equal parallel series, and for supplying direct current to the parallel series of primary coils, said means adapted to transfer the primary and secondary coils of each transformer element successively from one of their respective parallel series to the other when the magnetic flux in such element has reached a maximum, and means for each transformer element for conserving the energy of its magnetizing flux during the occurrence of the transfer.

4. A direct current transformer comprising a plurality of individual transformer elements, each having a primary coil and a secondary coil, the primaries and secondaries of all said elements being respectively connected in a closed series, means for dividing each of said closed series of coils into two equal parallel series, and for supplying direct current to the parallel series of primary coils, said means adapted to transfer the primary and secondary coils of each transformer element successively from one of their respective parallel series to the other when the magnetic flux in such element has reached a maximum, and means for each transformer element for conserving the energy of its magnetizing flux during the occurrence of the transfer and for temporarily maintaining at a low rate the electromotive force generated in said transformer element after the transfer has been made.

5. A direct current transformer comprising a plurality of individual transformer elements, each having a primary coil and a secondary coil, the primaries and secondaries of all said elements being respectively connected in a closed series, a rotatable contact device each for the primary and secondary series for dividing said respectively closed series each into two parallel series, the primary contact device also adapted to supply direct current to its two parallel series of coils, said devices adapted both to rotate in unison and to simultaneously transfer the primary and secondary coils of each transformer element successively from one of their respective parallel series to the other, when the magnetizing flux in such element has reached a maximum, and means for each transformer element for conserving the energy of the magnetizing flux of such element during the occurrence of said transfer.

6. A direct current transformer comprising a plurality of individual transformer elements, each having a primary coil and a secondary coil, the primaries and secondaries of all said elements being respectively connected in a closed series, a rotatable contact device for both the primary and secondary series for dividing said respective closed series each into two parallel series, the primary contact device also adapted to supply direct current to its two parallel series of coils, said device adapted both to rotate in unison and to simultaneously transfer the primary and secondary coils of each transformer element successively from one of their respective parallel series to the other when the magnetizing flux in such element has reached a maximum, and a short-circuiting coil on each transformer element and a rotatable short-circuiting device, rotating in unison with said contact devices for short-circuiting the last-named coils of those transformer elements, whose primaries and secondaries are about to be transferred from one of their parallel series to the other, to conserve the energy of the magnetizing flux of such transformer elements during the occurrence of the transfer.

7. A direct current transformer comprising a plurality of individual transformer elements, each having a primary coil and a secondary coil, the primaries and secondaries of all said elements being respectively connected in a closed series, a rotatable contact device each for the primary and secondary series for dividing said respective closed series each into two parallel series, the primary contact device also adapted to supply direct current to its two parallel series of coils, said devices adapted both to rotate in unison and to simultaneously transfer the primary and secondary coils of each transformer element successively from one of their respective parallel series to the other, when the magnetizing flux in such element has reached a maximum, and a short-circuiting coil on each transformer element and a rotatable short-circuiting device rotating in unison with said contact devices, for short-circuiting the last-named coil of those transformer elements, whose primaries and secondaries are about to be transferred from one of their parallel series to the other, to conserve the energy of the magnetizing flux of such transformer elements when the transfer occurs, and means for adjusting the time of short-circuit relatively to the time of transfer of said primary and secondary coils.

8. A direct current transformer comprising a plurality of individual transformer elements, each having a primary coil and a secondary coil, the primaries and secondaries of all said elements being respectively connected in a closed series, a rotatable contact device comprising a cylinder, a shaft rotatably disposed in the center thereof, carrying a plurality of pairs of diametrically oppositely disposed insulated contact arms, each having a contact shoe at its end, one pair of arms each for said primary and secondary series, peripheral rows of insulated contact studs suitably mounted on said cylinder to cooperate with said two pairs of arms, each stud of the row cooperating with the primary contact arms being connected in succession with one of the junction points of two adjacent primary coils, each stud of the row cooperating with the secondary contact arms being connected in succession with one of the junction points of two adjacent secondary coils, each pair of arms dividing its closed series of coils into two equal parallel series, a slip ring on said shaft for each arm of each arm pair and brushes cooperating therewith, said primary arms adapted to conduct direct current to said two parallel series of primary coils, the two arm pairs being disposed relatively to each other to simultaneously transfer, during rotation, the primaries and secondaries of two diametrically oppositely located transformer elements from one of their respective parallel series to the other when the magnetizing flux in such elements has reached a maximum, a short-circuiting coil on each transformer element, the latter coils of all transformer elements being connected in a closed series, a peripheral row of insulated contact studs on said cylinder, one stud for each junction point of adjacent short-circuiting coils, two diametrically opposite short-circuiting arms mounted on said shaft and cooperating with said studs, said latter arms being disposed relatively to said other contact arms to close the short-circuiting coils of the transformer elements, whose primary and secondary coils are being transferred.

9. A direct current transformer comprising a plurality of individual transformer elements, each having a primary coil and a secondary coil, the primaries and secondaries of all said elements being respectively connected in a closed series, a rotatable contact device comprising a cylinder, a shaft rotatably disposed in the center thereof, carrying a plurality of pairs of diametrically oppositely disposed insulated contact arms each having a contact shoe at its end, one pair of arms each for said primary and secondary series, peripheral rows of insulated contact studs suitably mounted on said cylinder to cooperate with said two pairs of arms, each stud of the row cooperating with the primary contact arms being connected in succession with one of the junction points of two adjacent primary coils, each stud of the row cooperating with the secondary contact arms being connected in succession with one of the junction points of two adjacent secondary coils, each pair of arms dividing its closed series of coils into two equal parallel series, a slip ring on said shaft for each arm of each arm pair and brushes cooperating therewith, said primary arms adapted to conduct direct current to said two parallel series of primary coils, the two arm pairs being disposed relatively to each other to simultaneously transfer, during rotation, the primaries and secondaries of two oppositely located transformer elements from one of their respective parallel series to the other when the magnetizing flux in such elements has reached a maximum, a short-circuiting coil on each transformer element, the latter coils of all transformer elements being connected in a closed series, a peripheral row of insulated contact studs on said cylinder, one stud for each junction point of adjacent short-circuiting coils, two diametrically opposite short-circuiting arms mounted on said shaft and cooperating with said studs, said latter arms being disposed relatively to said other contact arms to close the short-circuiting coils of the transformer elements, whose primary and secondary coils are being transferred, the cylinder portion carrying said short-circuiting studs being angularly adjustable relatively to the remainder of the cylinder for adjusting the time of short-circuiting relatively to the time of transfer.

10. In a direct current transformer having a closed series of coils carrying high tension current, a cylinder, insulated contact studs mounted on said cylinder and connected to successive junction points of said coils, said studs being mounted on said cylinders alternately in several radial planes to increase the peripheral distance between two studs connected to successive junction points, a contact arm for the studs in each radial plane, rotatable in said cylinder, each arm having a contact shoe at its free end, said arms being electrically connected with each other and their shoes being in alinement in the direction of the cylinder axis to connect successive junction points of said coil series to said arms when the latter rotate.

CHARLES S. BRADLEY.